United States Patent
Angless (10) Patent No.: US 6,254,520 B1
(45) Date of Patent: Jul. 3, 2001

(54) MANUFACTURE OF BAGS

(75) Inventor: David Michael Angless, Witchurch (GB)

(73) Assignee: Poly-Lina Limited, Middlesex (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/930,913

(22) PCT Filed: Apr. 25, 1996

(86) PCT No.: PCT/GB96/00997

§ 371 Date: Oct. 14, 1997

§ 102(e) Date: Oct. 14, 1997

(87) PCT Pub. No.: WO96/34737

PCT Pub. Date: Nov. 7, 1996

(30) Foreign Application Priority Data

May 1, 1995 (GB) .................................................. 9508808
Mar. 8, 1996 (GB) .................................................. 9604995

(51) Int. Cl.[7] ...................................................... B31B 27/26
(52) U.S. Cl. .......................... 493/243; 493/238; 493/248; 493/226
(58) Field of Search ....................................... 493/198, 226, 493/232, 233, 234, 237, 238, 243, 244, 248, 926, 304; 383/8, 121, 120

(56) References Cited

U.S. PATENT DOCUMENTS

| 3,263,901 | * | 8/1966 | Hoelzer | 383/120 |
| 3,518,810 | * | 7/1970 | Steeves | 493/304 |
| 3,670,953 | * | 6/1972 | Leventhal | 383/120 |
| 3,682,051 | * | 8/1972 | Sengewald | 493/926 |
| 4,666,423 | * | 5/1987 | Herrington | 493/248 |
| 4,759,742 | * | 7/1988 | Achelpohl | 493/926 |
| 4,923,436 | * | 5/1990 | Gelbard | 493/926 |
| 5,000,728 | * | 3/1991 | Dreckmann et al. | 493/226 |
| 5,573,489 | * | 11/1996 | Letendre et al. | 493/926 |
| 5,890,810 | * | 4/1999 | Barlow | 383/120 |

FOREIGN PATENT DOCUMENTS

2274446 * 7/1994 (GB) .

* cited by examiner

Primary Examiner—Peter Vo
Assistant Examiner—Louis K. Huynh
(74) Attorney, Agent, or Firm—Dykema Gossett PLLC (57) ABSTRACT

In the manufacture of bags with handles, an extruded plastics tube is extruded, folded inwardly by a first folding device (21) to form gusseted side portions (4) and flattened. A transverse heat seal is formed by a sealing device (22) and a cutting device (23) removes a central section of the tubing to form handle portions (10). The gusseted side portions (4) are folded in turn onto a medial tubing portion (3) by a second folding device (24) having arcuate folding ramps and a further transverse heat seal and a transverse perforation line are applied to the base of the bag.

18 Claims, 6 Drawing Sheets

MANUFACTURE OF BAGS

BACKGROUND OF THE INVENTION

1. Field of the Invention

This invention relates to a method of and apparatus for the manufacture of plastic bags, e.g., for use as bin liners.

2. The Prior Art

It is well known to manufacture plastic bags from a continuous tube of extruded polyethylene. The extruded tubing is expanded to reduce the thickness of the polyethylene film, flattened, heat sealed and severed across the width of the tubing, such that the heat seals form the bottoms of the bags. Handles can be formed by removing an upper central section of the bags, and by providing a series of transverse perforation lines rather than severing the tubing, a series of bags which an be wound into a roll may be produced. In order to reduce the width of the rolls of bags, an to reduce the size of the machinery required for the bag manufacture, it is known to fold the sides of the tubing inwardly to form gussets prior to sealing. It is also known to fold the gusseted tubing prior to sealing as described in GB-A-1584746, which enables an especially strong seal to be produced. However, this folding method is not suitable for the manufacture of rolls of interconnected bags formed with hands, as the folding operation superimposes the handles at the same side of the folded tube, and the resulting string of bags cannot be satisfactorily wound into a roll. Handles at the open end of a bag are often desirable for tying closed the bag after it has been filled, e.g., with refuse, or to facilitate carrying the bag.

GB-A-2 274 446 addresses the drawbacks of the aforementioned folding method by providing a bag having laterally opposed gusseted side portions folded about longitudinal fold liens onto opposite sides of a medial portion.

The method of bag folding described in GB-A-2 274 446 secures the advantage of a strong base seal. It also enables manufacture of a bag with handles that, in its folded form, is considerably narrower than previously known bags with handles, and the handles of the folded bag may be located at laterally opposed sides of the bag which is desirable when a string of bags is to be wound into a wall.

SUMMARY OF THE INVENTION

The present invention relates to an improved folding method and it provides a method of manufacturing a bag from layflat tubing comprising steps of first folding the longitudinal edges of the tubing to form inwardly extending gussets, further folding the flattened gusseted tubing to reduce the tubing's width, transversely sealing the folded and gusseted tubing to form a base seal, and forming handles between the folding operations by removing a central section of the gusseted tubing and by transversely sealing the tubing at a position corresponding to the ends of the handles, characterised in that the gusseted portions are folded successively about respective longitudinal fold lines to lie against opposite sides of a medial portion of the tubing between the gusseted portions.

In the preferred method the gusseted portions are each folded by passing the flattened tubing over a discrete arcuate folding ramp having a lateral edge around which the gusseted portion is folded, nips are provided upstream of and downstream of each folding ramp, the tension of the tubing as it passes over the folding ramp is controlled by adjusting the relative speed of the nips, and the orientation of the nips is adjusted to maintain a substantially uniform tension across the width of the tubing as it passes over the folding ramp. The adjustment of the orientation of the nips allows satisfactory folds to be achieved despite the asymmetry of the two stage second folding process.

Although the order in which steps of removing the central section of the gusseted tubing and sealing the tubing at the position corresponding to the ends of the handles are performed is readily interchangeable, it has been found that the bag manufactured process is easier to control when the tubing is transversely sealed at the position corresponding to the ends of the handles before the central section of the gusseted tubing is removed.

Further in the preferred method, a series of bags are formed from a continuous length of layflat tubing, the handles on one bag being connected to the base of the next bag, and a transverse line of weakness is formed between adjacent base and handle seals to facilitate separation of individual bags, said line of weakness being produced after folding of the two bag joined at the line of weakness has been completed. By providing the transverse line of weakness, e.g., a row of perforations, after the tubing is folded, the tubing can be subjected to greater tension during folding than would otherwise be possible, and hence the speed of the tubing and the rate of production of bags can be increased.

The present invention also provides apparatus for manufacturing a series of bags from layflat tubing comprising: first folding means for folding the longitudinal edges of the tubing to form inwardly extending gussets, second folding means for further folding the gusseted tubing to reduce the tubing's width; means for transversely sealing the folded and gusseted tubing thereby to form a base seal; and means for producing a transverse line of weakness extending across the tubing to facilitate separation of individual bags; cutting means for removing a central section of the tubing for forming handles, and sealing means to seal the tubing transversely at a position corresponding to the ends of the handles are provided between the first and second folding means, characterised in that the second folding means is arranged to fold the gusseted portions about respective longitudinal fold lines in succession to lie against opposite sides of a medial portion of the tubing between the gusseted portions.

A clear understanding of the invention will be gained form the following description of the preferred embodiment, which is given with reference to the accompanying drawings.

DETAILED DESCRIPTION OF THE PREFERRED EMBODIMENT

In FIGS. 1–5 of the drawings, the layers of plastic film which make up a bag are shown separated, but this is for ease of illustration only and it will be understood that in practice they lie flat against each other.

Figure 1:
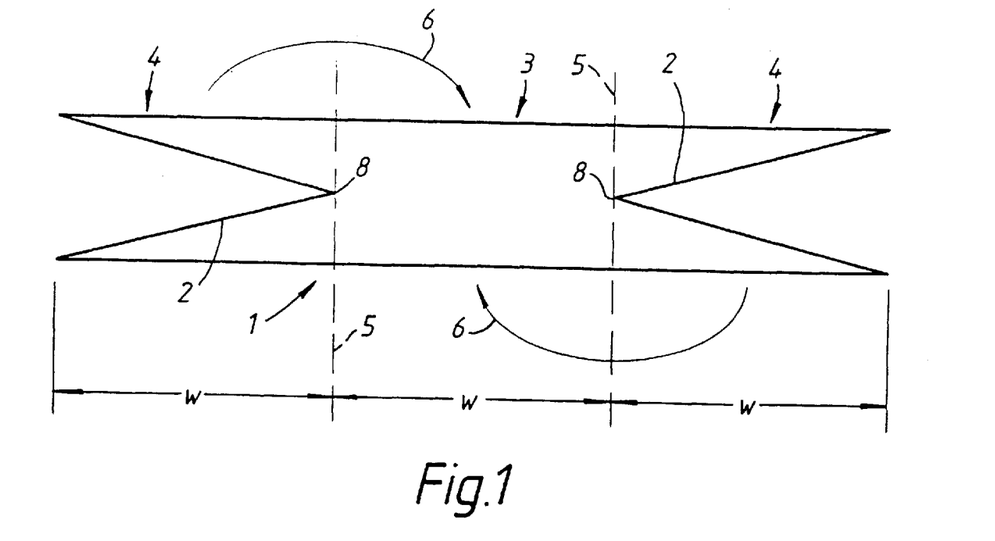
FIG. 1 is a cross-section through the tubing after the gussets are formed.

The tubing shown in FIG. 1 has equal gussets 2 having a depth w substantially equal to one third the width of the gusseted tubing, thereby leaving a medial tubing portion 3 of width w between the two gusseted side portions 4, also of width w.

Figure 2:
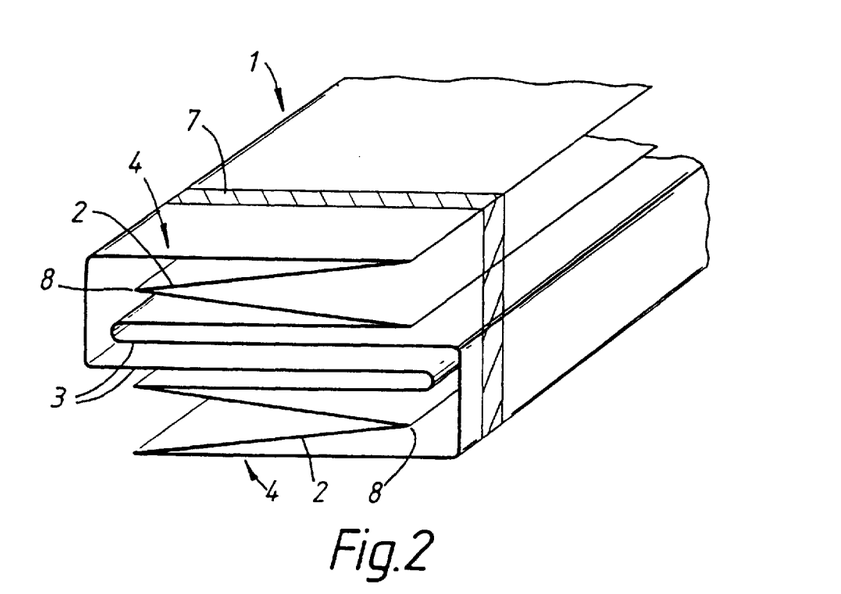
FIG. 2 is a schematic sectioned perspective view showing the bottom of a finished bag.

The gusseted side portions 4 are folded over about respective longitudinal fold lines 5 to lie against the opposite side faces of the medial portion 3, as indicated by the arrows 6 in FIG. 1, so that the folded tubing assumes the configuration illustrated in FIG. 2. A welded seal 7 is produced across the full width of the folded tubing by applying a heated blade, wire or bar against the folded tubing in well known manner, and as will be seen from FIG. 2 ten layers of film become welded together over essentially the complete length of the seal. Alternatively, a heated blade wire or bar may be applied contemporaneously to each side of the tubing. A very strong seal is obtainable as a result of either method.

Tests have shown the seal does not have any identifiable weak points.

Figure 3:
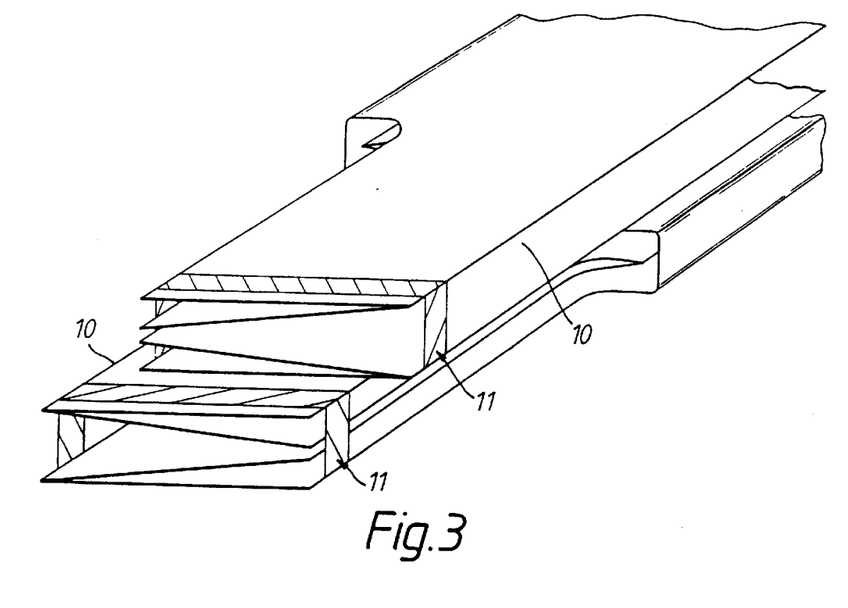
FIG. 3 is a similar schematic view showing the upper end of the finished bag when folded.
Figure 4:
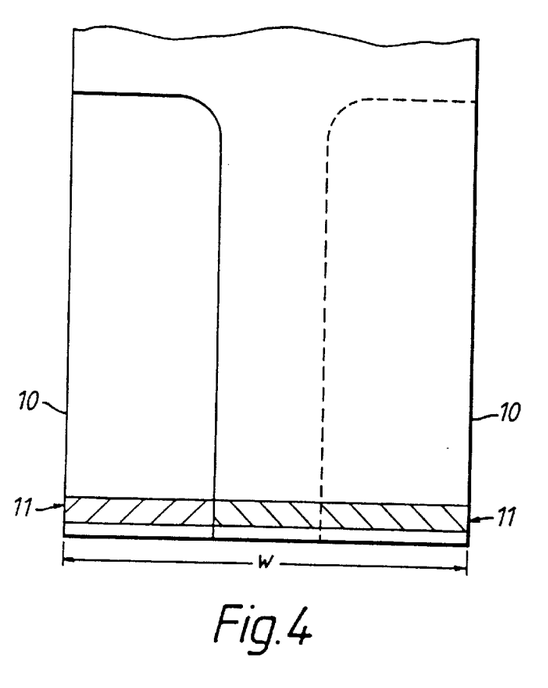
FIG. 4 is a plan view of the upper end of the folded bag shown in FIG. 3.
Figure 5:
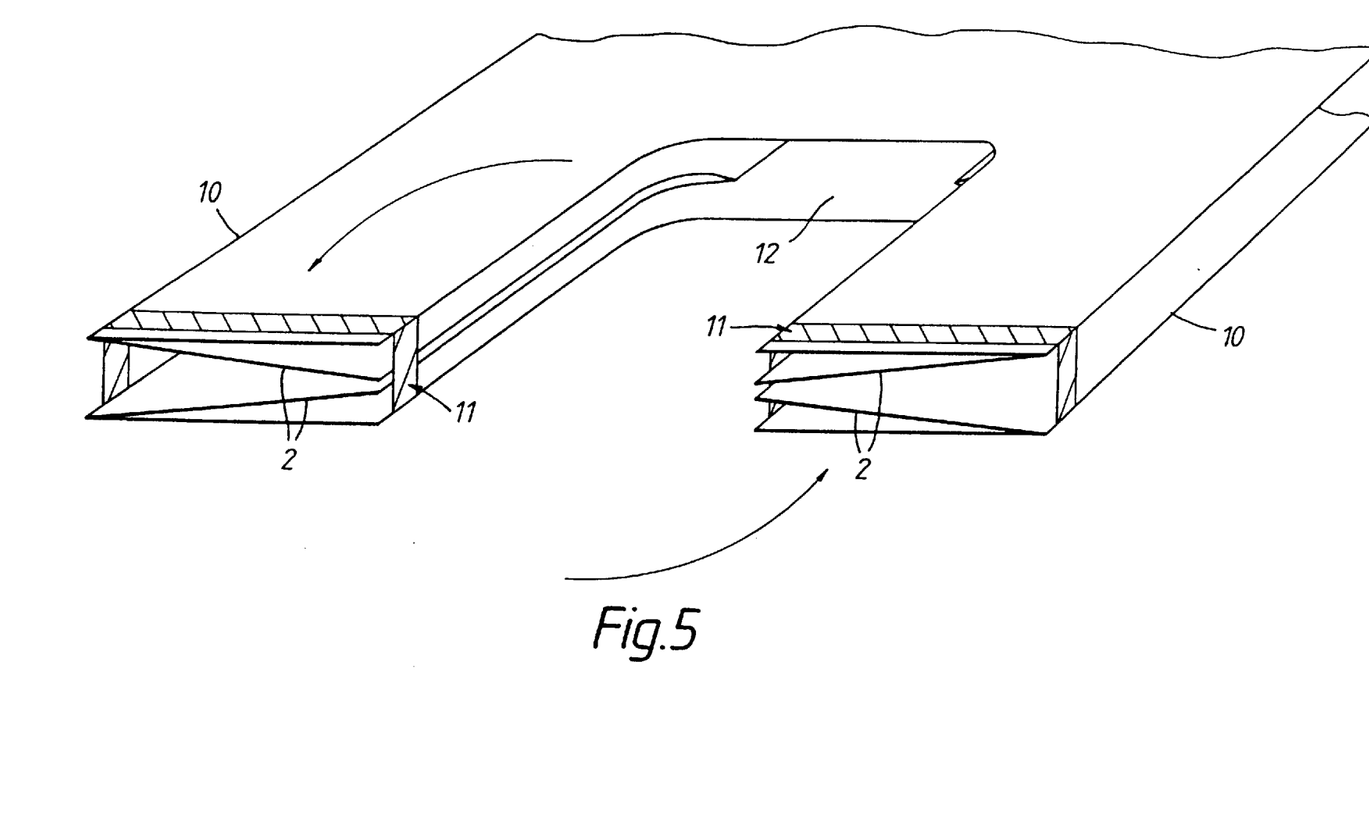
FIG. 5 is a similar view to FIG. 3 showing the bag unfolded and ready to be opened.

FIGS. 3, 4 and 5 show the upper end of the bag which is open and has handle 10 provided by removal of a bag segment, for example, by an appropriate cutting operation. The handles 10 are formed at opposite sides of the gusseted tubing 1 and have a width less than the gusset width. Preferably, the width of each handle is between ½ w and ⅔ w so that when the bag is folded the handles overlap in the central region of the folded bag. A welded seal 11 is produced across the upper ends of the handles, by applying a heated blade wire or bar, in a similar manner to the production of the welded seal 7, to connect the layers of plastic film forming the handles. A continuous tube of gusseted plastic film can be formed into a continuous series of bags with the handles of one bag connected to the base of the next bag and by providing suitable perforations between the base seal 7 of one bag and the handle seals 11 of the next bag, single bags can be easily separated for use by tearing bags apart at the perforations. FIG. 5 shows the upper end of the bag unfolded ready for use with the handles 10 to the sides of the mouth of the bag 12. After the bag has been used, the mouth 12 can be closed by tying the handles 10 together, if desired.

Figure 6:
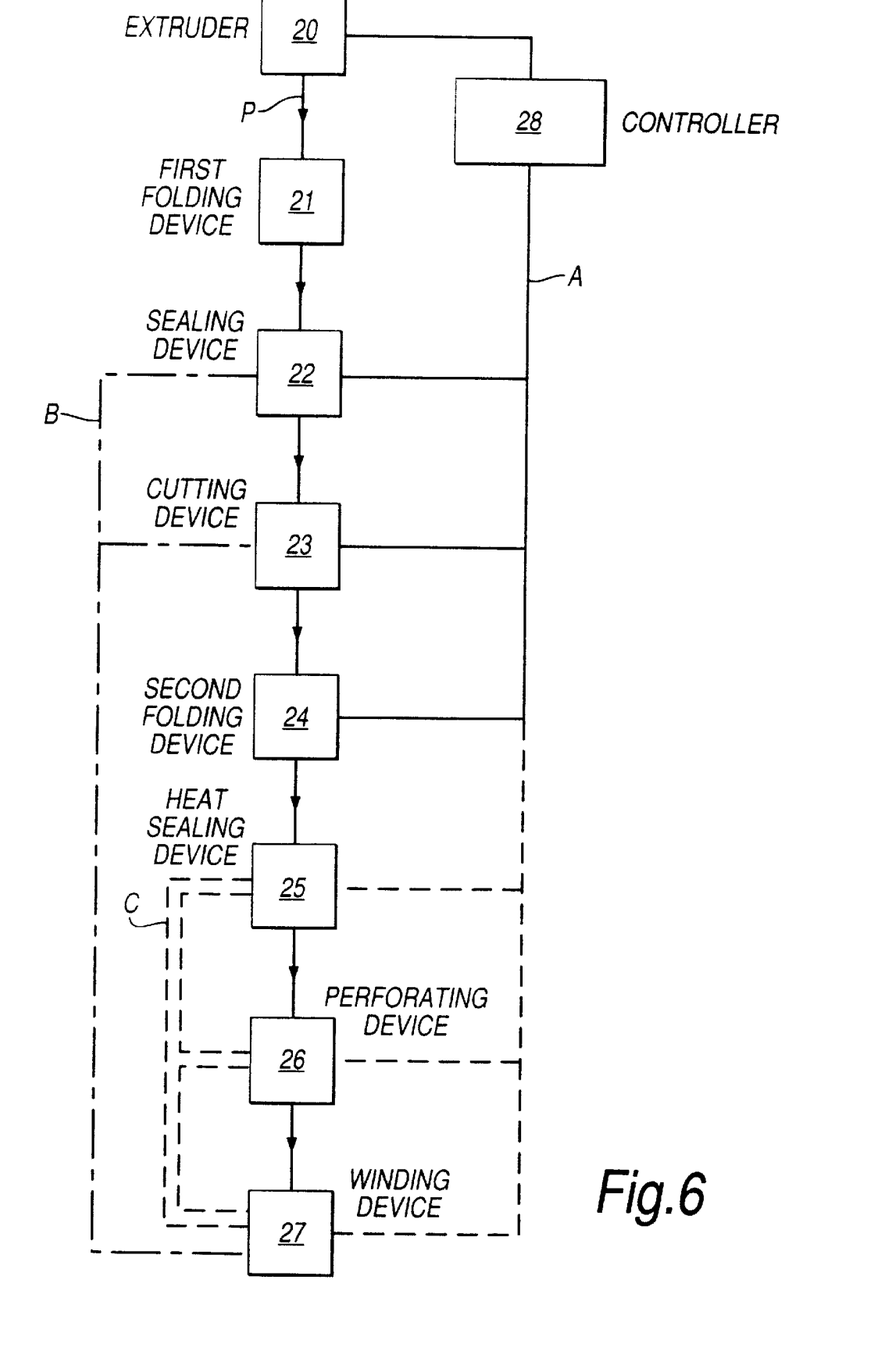
FIG. 6 shows the steps involved in forming the finished bag.

FIG. 6 shows the steps involved in forming a series of bags according to this invention from a expanded polyethylene tube 1.

The polyethylene tubing 1 is extruded continuously from an extruder 20 and expanded to form an upright cylindrical column in a known manner. The expanded tubing is drawn upward by a speed reference nip through a first folding device 21 which contemporaneously forces the sides of the tubing inwardly to form the gussets 2 as described above and flattens the cylindrical column of tubing. Alternatively, the extruded tubing could be flattened and then gusseted in a manner known per se. Furthermore, according to a modification shown in FIG. 7 a larger column of tubing is expanded from an extruder 40 and flattened without gussets. The tubing is slit sealed longitudinally to form a plurality, e.g. three, flattened tubings of equal width. The tubings are separated by a series of guiding rollers 41 and delivered to folding devices 42. Each tubing is re-inflated and gusseted in a similar manner to the first described alternative by folding devices 42. In this manner a plurality of parallel production lines can be fed form a single extruder 40. The extruder 40 and extruder 20 differ only in scale. In each embodiment the following description of the bag forming process and apparatus applies equally to the single production line of FIG. 6 and each of the parallel production lines of FIG. 7.

The handles 10 of individual bags to be made from the continuous tubing are formed by first heat sealing the tubing across its width in a sealing device 22 which, in a manner itself well known, applies a heated blade so that the layers of film are welded together. The transverse seals are formed at regular intervals along the tubing corresponding to the length of bags being produced. A central section of the gusseted tubing adjacent to each seal is then removed by an appropriate cutting device 23 to form the handles at either side of the gusseted tubing. It will be appreciated that the removed central tubing section includes the medial part of the transverse seal between the handles. The sealing and cutting devices 22 and 23, could be combined into one device and/or their order reversed.

The tubing is next folded by a second folding device 24 described in more detail below. A base seal 7 is provided across the width of the folded bag as described above by a heat sealing device 25, and a series of perforations made across the width of the tubing between the base seal 7 of one bag and the handle seal 11 of the next bag by a perforating device 26. Sealing and perforating devices, 25 and 26, could also be combined into a single device and/or their order reversed. Finally the tubing is wound into a roll by a winding device 27. The individual bags may be separated before rolling, and rolled such that the individual bags overlap. The roll of bags may or may not have a separate core element, e.g. a cardboard tube, depending on the particular requirements of the user.

Advantageously, in the preferred order of operations, the perforations are provided after the folding has been completed, i.e. downstream of the second folding means 24 along the tubing path, which allows the tubing to be drawn through the folding devices and other apparatus upstream of the perforation device at a greater speed than otherwise would be possible.

Figure 7:
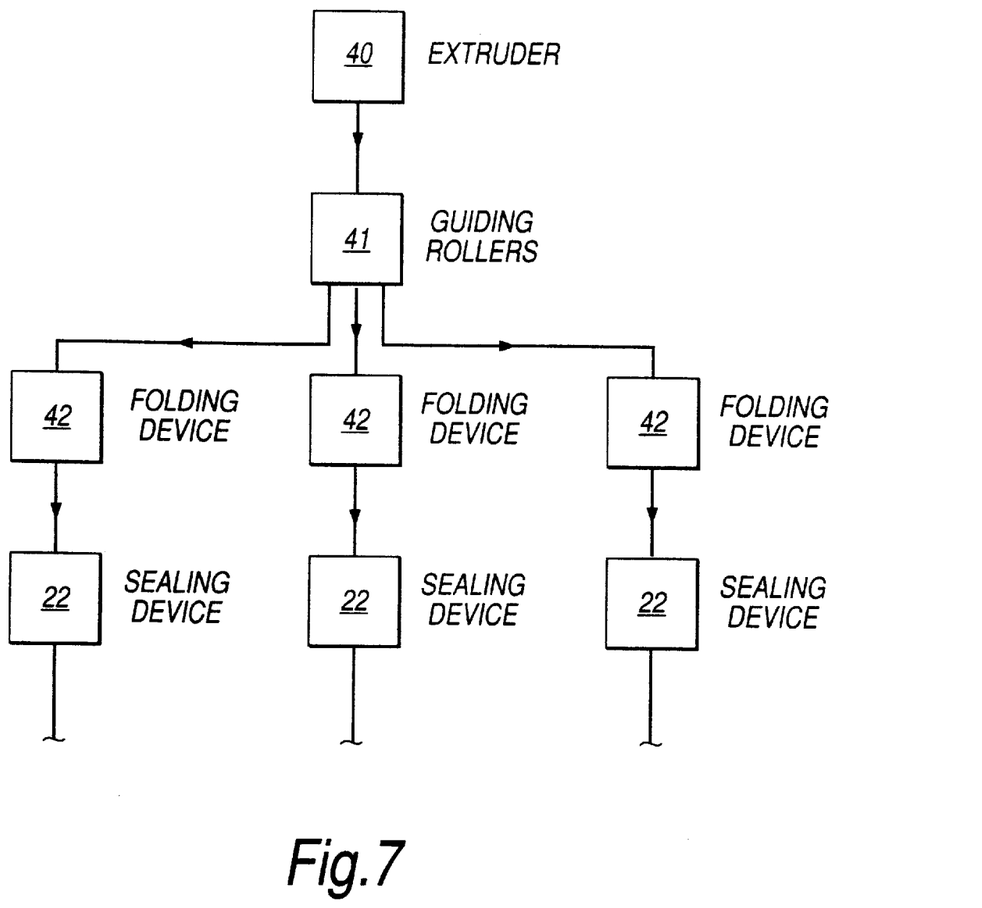
FIG. 7 shows the initial steps involved in forming a plurality of parallel production lines from a single extruder.

A line speed reference signal (A) can be sent from the speed reference nip to a controller 28 which co-ordinates the speed of the sealing, cutting and folding devices 22,23 and 24 in the single production line of FIG. 6 or each of the parallel production lines of FIG. 7.

The sealing and cutting devices 22 and 23 are co-ordinated by a co-ordination reference signal (B) generated in the first device after the first folding device 21.

Sensing of the hole created by the removed bag segment formed by cutting device 23 triggers the operation of the sealing and perforating devices 25,26. Preferably an optical sensor is used to sense the hole, but any other suitable sensor may be used.

Winding device 27 is coordinated by sensing the perforations formed by perforating device 26.

Optionally the number of bags wound into rolls by the winding device 27 can be counted using the co-ordination reference signal (B), or direct from devices 25 or 26 using reference signal (C). In the preferred embodiment the speed control for sealing, perforating and winding devices 25,26 and 27 is discrete from the speed reference signal (A), but devices 25,26 and 27 may alternatively be controlled using signal (A).

Figure 8:
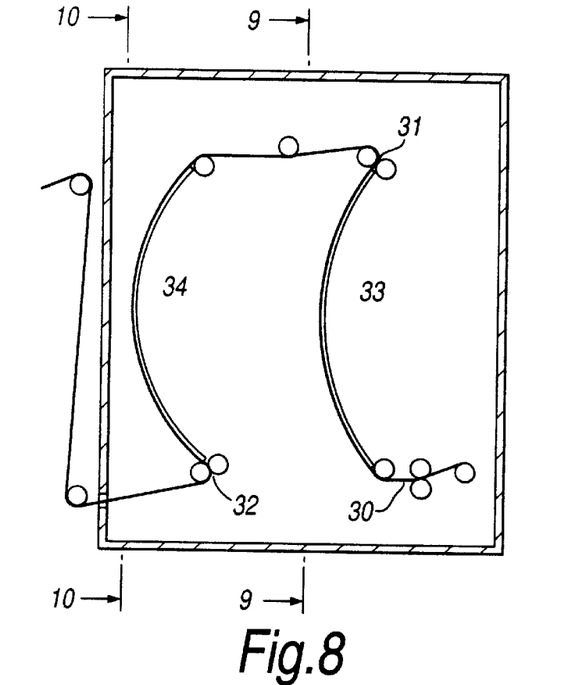
FIG. 8 is a schematic side view of a folding device.
Figure 9:
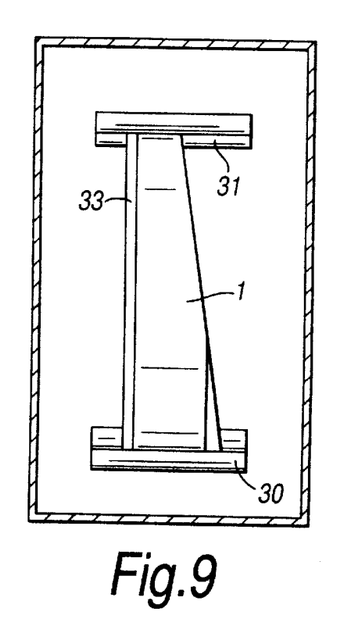
FIGS. 9 and 10 are taken along the lines 9—9 and 10—10, respectively in FIG. 8.
Figure 10:
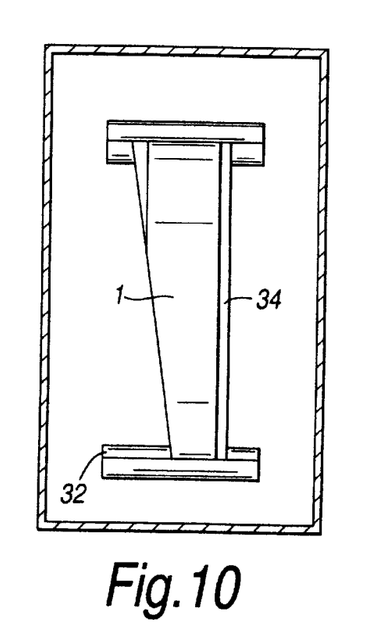

FIGS. 8–10 show schematically the second folding device which has first and second nips 30, 31 with a first arcuate folding ramp or plate 33 therebetween, and a second arcuate folding ramp or plate 34 located between the second nip 31 and a third nip 32. The ramps have lateral edges around which the tubing is folded. The tubing 1 passes under tension between the two nips, 30 and 31, which guide the tubing over the first ramp 33, such that one outer side portion 4 of the flat tubing is folded by the ramp 33 onto the medial portion 3 of the tubing. The tubing then passes, under tension, over the ramp 34 between the second and third nips, 31 and 32, which folds the other side portion of the tubing 4 onto the opposite side of the medial portion, thereby sandwiching the medial portion between the two outer portions.

The tension of the tubing passing across the folding ramps 33,34 is controlled by varying the speed of the nip 30–32, and by adjusting the orientation of the nips an even tension can be maintained across the width of the tubing as it passes across the ramps 33,34. The maintenance of an even tension across the width of the tubing allows a satisfactory fold to be achieved as each of the two side portions 4 is successively folded onto the medial portion 3.

What is claimed is:

1. A method of manufacturing a bag from layflat tubing comprising the sequential steps of:

folding opposite longitudinal edges of the tubing to form respective inwardly-extending gussets, thereby providing respective gusseted portions of said tubing;

removing a central section of the gusseted tubing to form handles and transversely sealing the tubing at a position corresponding to ends of the handles;

successively folding the respective gusseted portions about respective longitudinal fold lines to lie against opposite sides of a medial portion of the tubing between the respective gusseted portions; and transversely sealing the folded and gusseted tubing to form a base seal.

2. A method according to claim 1, wherein the tubing is folded to form gusseted tubing portions with gussets extending inwardly to a depth substantially one third the width of the gusseted tubing.

3. A method according to claim 1, wherein the gusseted portions are each folded by passing the flattened tubing over respective folding ramps, each ramp having a lateral edge around which the gusseted portion is folded.

4. A method according to claim 3 wherein said gusseted tubing is fed through nips provided upstream of and downstream of each folding ramp, and including a step of adjusting nip speed in order to control the tension of the tubing as it passes over each respective folding ramp.

5. A method according to claim 4, including a step of adjusting the orientation of the nips to maintain substantially uniform tension across the width of the tubing as it passes over the folding ramps.

6. A method according to claim 1, wherein the tubing is transversely sealed at the position corresponding to the ends of the handles before the central section of the gusseted tubing is removed.

7. A method according to claim 1, wherein the speed of the tubing between the first folding of the tubing and the transverse sealing of the folded and gusseted tubing is controlled using a signal generated according to the speed after the tubing is first folded.

8. A method according to claim 1, wherein a series of bags are formed from a continuous length of layflat tubing, the handles of one bag being connected to the base of the next bag, and a transverse line of weakness is formed between adjacent base and handle seals to facilitate separation of individual bags, said line of weakness being produced after folding of the two bags joined at the line of weakness has been completed.

9. Apparatus for manufacturing a series of bags from layflat tubing comprising:

first folding means for folding the longitudinal edges of the tubing to form inwardly extending gussets;

cutting means for removing a central section of the tubing for forming handles, and sealing means to seal the tubing transversely at a position corresponding to the ends of the handles;

second folding means arranged to fold the gusseted portions about respective longitudinal fold lines in succession so as to lie against opposite sides of a medial portion of the tubing between the gusseted portions, said second folding means comprising separate first and second folding elements;

means for transversely sealing the folded and gusseted tubing thereby to form a base seal; and means for producing a transverse line of weakness extending across the tubing to facilitate separation of individual bags.

10. Apparatus according to claim 9 wherein the first folding means is arranged to fold the longitudinal edges of the tubing to substantially one third the width of the gusseted tubing to form gusseted portions of the tubing.

11. Apparatus according to claim 9, wherein said first and second folding elements comprise two separate folding ramps for folding the respective portions onto the medial portions, and guiding means for guiding the flattened tubing over the folding ramps.

12. Apparatus according to claim 11, wherein the guiding means comprise nips upstream of and downstream of each folding ramp, the relative speed of the nips being adjustable to control the tension in the tubing as it passes over the ramp.

13. Apparatus according to claim 12, wherein the nips are adjustable in position to maintain a substantially uniform tension across the width of the tubing as it passes over the ramps.

14. Apparatus according to claim 11, wherein each of said two separate folding elements consists of a ramp having an arcuate shape.

15. Apparatus according to claim 9, wherein the sealing means is arranged to seal across the full width of the gusseted tubing, and the cutting means is positioned downstream of the sealing means and is arranged to remove with a central section of the tubing a portion of the seal produced by the sealing means.

16. Apparatus according to claim 9, wherein a controller is provided to sense the speed of the gusseted tubing and generate a signal for co-ordinating the operating speed of the cutting means, the sealing means and the second folding means.

17. Apparatus according to claim 9, wherein the means for producing a transverse line of weakness are downstream of the second folding means.

18. A method of manufacturing a bag from layflat tubing comprising the sequential steps of:

(a) folding opposite longitudinal edges of said layflat tubing to form inwardly-extending gussets and provide first and second gusseted portions of said layflat tubing, (b) removing a central section of said layflat tubing formed in step (a) to form handles and transversely sealing said layflat tubing at a location corresponding to ends of said handles, (c) passing said layflat tubing obtained in step (b) over a first folding element to fold said first gusseted portion about a first fold line and lie against a first side of a medial portion of said layflat tubing, (d) passing said layflat tubing obtained in step (c) over a second folding element to fold said second gusseted portion about a second fold line and lie against an opposite second side of a medial portion of said layflat tubing, and (e) transversely sealing the layflat tubing obtained in step (d) to form a base seal.

* * * * *